(12) United States Patent
Cancellieri

(10) Patent No.: US 9,995,241 B1
(45) Date of Patent: Jun. 12, 2018

(54) CONTROLLING FUEL INJECTORS USING CORRELATED GAIN CURVE DATA

(71) Applicant: GM GLOBAL TECHNOLOGY OPERATIONS LLC, Detroit, MI (US)

(72) Inventor: Angelo Cancellieri, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 31 days.

(21) Appl. No.: 15/359,847

(22) Filed: Nov. 23, 2016

(51) Int. Cl.
| F02M 51/00 | (2006.01) |
| F02D 41/40 | (2006.01) |
| F02M 63/02 | (2006.01) |
| F02M 65/00 | (2006.01) |
| F02D 41/26 | (2006.01) |
| F02D 41/24 | (2006.01) |

(52) U.S. Cl.
CPC ........ F02D 41/40 (2013.01); F02D 41/2432 (2013.01); F02D 41/2441 (2013.01); F02D 41/2467 (2013.01); F02D 41/263 (2013.01); F02M 63/0275 (2013.01); F02M 65/003 (2013.01); *F02D 2200/0602* (2013.01)

(58) Field of Classification Search
CPC .............. F02B 19/1052; F02B 19/1085; F02D 35/0046; F02D 35/0069; F02D 19/081; F02D 2041/2055; F02D 41/30; F02D 41/20; F02D 41/40; Y02T 10/44

USPC .......... 701/101–103; 123/434, 456, 478, 480
See application file for complete search history.

(56) References Cited

U.S. PATENT DOCUMENTS

| 2011/0022290 A1* | 1/2011 | Kaneko | F02D 41/222 701/103 |
| 2012/0035833 A1* | 2/2012 | Melis | F02D 41/401 701/104 |
| 2016/0237937 A1* | 8/2016 | Kusakabe | F02D 41/20 |
| 2016/0356233 A1* | 12/2016 | Laviola | F02D 41/222 |
| 2016/0377017 A1* | 12/2016 | Basmaji | F02D 41/3845 701/103 |

\* cited by examiner

*Primary Examiner* — John Kwon
(74) *Attorney, Agent, or Firm* — Lorenz & Kopf LLP

(57) ABSTRACT

Methods and systems are provided for controlling fuel injectors included in a fuel injection system of an internal combustion engine of a vehicle. The fuel injection system includes a fuel rail. The methods and systems measure data for the fuel injector relating fuel injection flow rate and fuel injector energization time at a first rail pressure. The methods and systems transform the measured data using a correlation function t to correlated data relating fuel injection flow rate and injector energization time at a second rail pressure different from the first rail pressure. The methods and systems control the fuel injector using the correlated data relating fuel injection flow rate and injector energization time.

20 Claims, 4 Drawing Sheets

US 9,995,241 B1

CONTROLLING FUEL INJECTORS USING CORRELATED GAIN CURVE DATA

TECHNICAL FIELD

The present disclosure generally relates to controlling fuel injectors, and more particularly relates to generating control data for different the fuel injectors operating at different rail pressures.

BACKGROUND

This section provides background information related to the present disclosure which is not necessarily prior art.

Internal-combustion engines for vehicles are provided with electronic fuel injection systems having one or more fuel injectors for admitting fuel to the combustion chamber of the engine. For reasons of fuel efficiency and exhaust emissions reduction, it is of importance to be able to control precisely the volume of fuel injected by one or more fuel injectors into each cylinder of the engine. In practice, fuel injection systems have at least one injector for each cylinder of the engine and an electronic control unit for controlling each injector individually. Flow-rate variance from injector to injector may occur due to manufacturing variances and/or as a result of injector ageing. In this regard, flow-rate means the amount of fuel passing through the injector per unit of time at a given fuel pressure. The electronic control unit is able to produce control signals that control energization or open time of each injector. The amount of fuel injected, however, can vary in the flow-rate characteristics which may be encountered amongst injectors fitted in the same injection system and over the lifetime of the engine.

In order to compensate for such flow rate variance, calibration cycles are implemented by which measurements are taken relating fuel injection flow rate and injector energization time in order to provide fuel injection gain data. The fuel injection gain data is provided in a map in memory for use in generating control signal for operating the engine. The map relates target fuel injection volume, energization time, rail pressure and injector ID. The map is initially established at manufacturing and may be adjusted throughout the lifetime of the engine. In order to determine the adjusted maps during the operative lifetime of the engine, measurement cycles are run during an engine idle condition at various lower rail pressures, but measurement cycles are not run for higher rail pressure. Such a system may compromise the accuracy of the fuel injection gain data for the higher rail pressures. However, performing the measurement cycles at the higher rail pressure may not be acceptable because of perceptible engine noise in the idle state.

It should also be appreciated that there is a trend to operate engines more in higher rail pressure conditions for efficiency and fuel emission reasons.

Accordingly, it is desirable to establish fuel injection gain data for use in controlling fuel injectors in a time efficient, and accurate way that is operable at high rail pressures without unacceptable engine noise. Furthermore, other desirable features and characteristics of the present invention will become apparent from the subsequent detailed description and the appended claims, taken in conjunction with the accompanying drawings and the foregoing technical field and background.

SUMMARY

A method is provided of controlling a fuel injector. The fuel injector is included in a fuel injection system of an internal combustion engine of a vehicle. The fuel injection system includes a fuel rail. The method includes measuring data for the at least one fuel injector relating fuel injection flow rate and fuel injector energization time at a first rail pressure. A correlation function is used to transform the measured data to correlated data relating fuel injection flow rate and injector energization time at a second rail pressure different from the first rail pressure. The fuel injector is controlled using the correlated data relating fuel injection flow rate and injector energization time.

A fuel injection system is provided that includes a fuel injector, a fuel rail, and an electronic control unit. The electronic control unit is configured to measure data for the fuel injector relating fuel injection flow rate and fuel injector energization time at a first rail pressure. A correlation function is used to transform the measured data to correlated data relating fuel injection flow rate and injector energization time at a second rail pressure different from the first rail pressure. The fuel injector is controlled using the correlated data relating fuel injection flow rate and injector energization time.

Further, a non-transitory computer readable medium is provided that stores a program, which when executed on an electronic control unit is configured to measure data for the fuel injector relating fuel injection flow rate and fuel injector energization time at a first rail pressure, transform the measured data using a correlation function to correlated data relating fuel injection flow rate and injector energization time at a second rail pressure different from the first rail pressure, and control the fuel injector using the correlated data relating fuel injection flow rate and injector energization time.

DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the invention disclosed herein or the application and uses of the invention disclosed herein. Furthermore, there is no intention to be bound by any principle or theory, whether expressed or implied, presented in the preceding technical field, background, summary or the following detailed description, unless explicitly recited as claimed subject matter.

Figure 1:
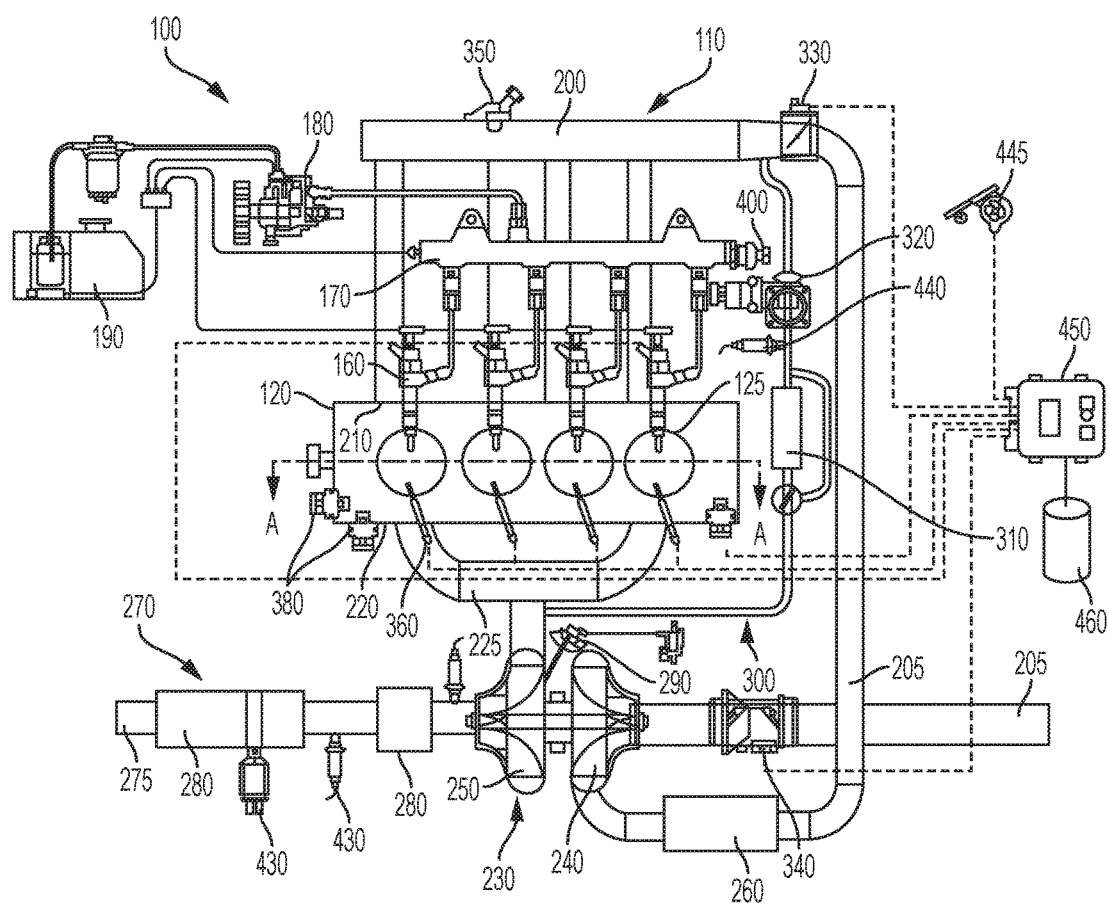
FIG. 1 schematically shows an automotive system according to an embodiment of the present disclosure.
Figure 2:
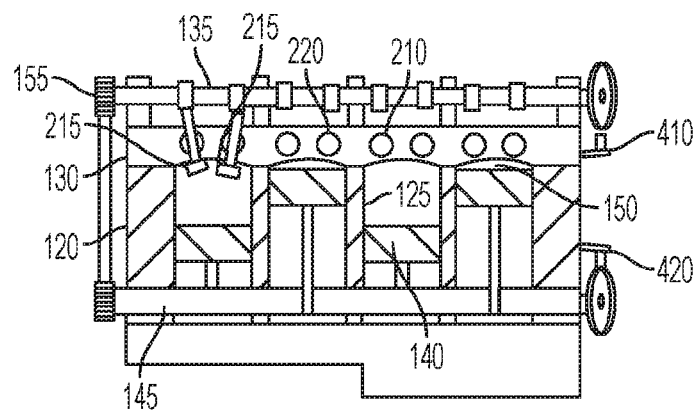
FIG. 2 is the section A-A of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. A variety of fuel rail pressures are used for injecting fuel. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an aftertreatment system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The aftertreatment system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters, such as a Selective Catalytic Reduction on Filter (SCRF) 500.

The SCRF 500 may be associated with a temperature sensor upstream of the SCRF 500 and temperature sensor downstream of the SCRF 560.

Other embodiments may include a high pressure exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

Other embodiments may include also a low pressure exhaust gas recirculation (EGR) system, not described in detail herein.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure sensors 430, an EGR temperature sensor 440, an accelerator pedal position sensor 445 and a fuel injection rate sensor 712 (schematically shown in FIG. 4). The fuel injection rate sensor 712 is configured to measure values in order to allow fuel injection rate to be determined using known methodologies, such as based on crank-wheel acceleration frequency analysis, mass air flow and exhaust $O_2$ concentration, in-cylinder pressure sensor, high frequency fuel system pressure analysis, measurement of the torque pulses supplied by each cylinder of the engine with the use of a dynamic torque measurement method, etc. Fuel injection rate or fuel injection flow rate represents, in various embodiments, a volume of fuel injected per unit time by a fuel injector. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system 160 is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product, the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
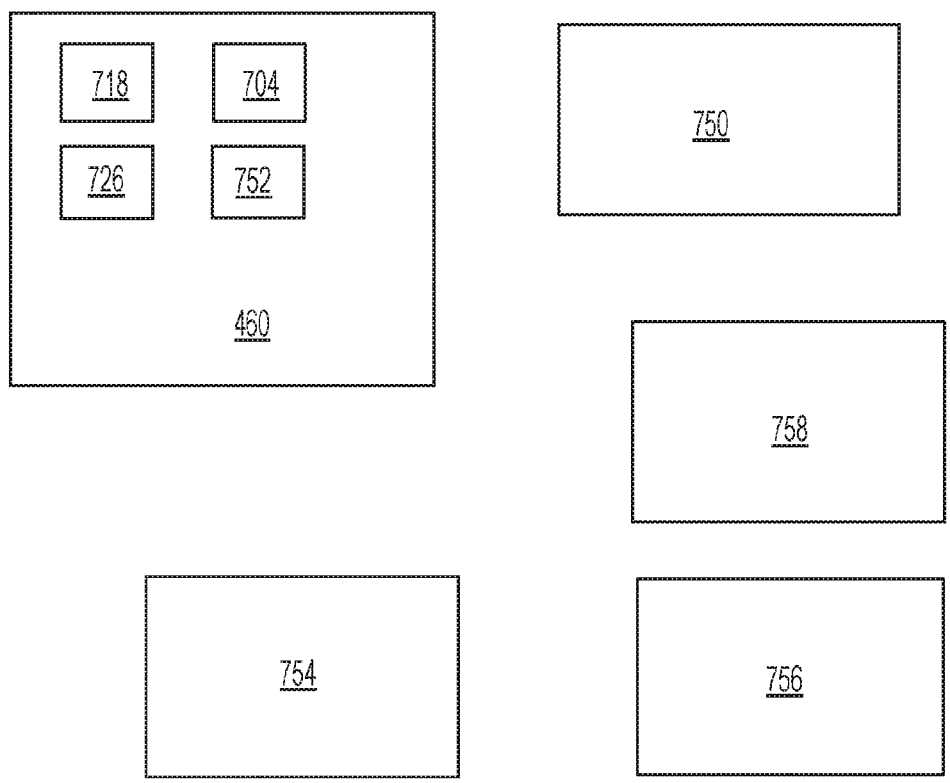
FIG. 3 is a system module block diagram illustrating control modules for implementing methods and systems as disclosed herein.

FIG. 3 shows a system of modules, implemented in the ECU 450, for performing the methods, and implementing the systems, described herein. The system of modules will be described in conjunction with the data flow diagram of FIG. 4 and vice versa. Data transformations shown in FIG. 4 may be implemented by various modules shown in FIG. 3, as will be described. As used herein, the term module refers to an application specific integrated circuit (ASIC), an electronic circuit, a processor 750 (shared, dedicated, or group) of the ECU 450 and memory including non-transitory memory system 460 that executes one or more software or firmware programs 752, a combinational logic circuit, and/or other suitable components that provide the described functionality. In particular, the modules described herein include at least one processor 750, a non-transitory memory system 460 and at least one computer program 752 stored on the memory system 460 for implementing the various functions and processes described with respect to the modules. Although separate modules are described herein, this does not exclude an integrated topology.

In FIG. 3, there is shown a gain curve measurement module 758 that is configured to run a measurement or test cycle. The measurement cycle aims to measure gain curve data 770 (FIG. 4) relating fuel injection rate to injector energization time, thereby defining a fuel injector gain curve 780 (FIG. 5). The fuel injector energization time is determined by a pulse width (on time) of an electric control signal applied to a fuel injector 160 under test. The gain curve measurement module 758 is configured to control generation of control signals 710 (FIG. 4) of a range of pulse widths corresponding to a range of energization times, to apply the control signals 710 sequentially to the fuel injector 160 under test and to measure and record fuel injection rates resulting from each pulse to implement the measurement cycle. The measurement cycle generates measured gain curve data 770 corresponding to a fuel injection rate gain curve for each of the fuel injectors 160. The measurement cycle may be performed for each injector at a range of rail pressures. The measurement cycle is generally performed during an engine idle and/or deceleration fuel cut-off state.

FIG. 5 shows an exemplary measured gain curve 780 for one of the fuel injectors 160. The measured gain curve 780 has been determined by the gain curve measurement module 758 obtaining measurements of fuel injection rate (the y axis in FIG. 5) for each of multiple injector energization times (the x-axis in FIG. 5) as determined by applied control signals 710. The applied control signals 710 are test control signals stored in a map of measurement parameters 726 (shown in FIG. 3). The measurements of fuel injection rate as a result of each injector energization may be performed in a number of ways through the fuel injection rate sensor 712 described above. The measurements are performed at a set rail pressure. The measurement cycle may be repeated for each of the fuel injectors 160 and at a plurality of rail pressures.

In one exemplary embodiment as derivable from FIG. 5, the gain curve measurement module 758 is configured to control generation of at least 5, preferably at least 10 different injector energization times. For example, 15 control signals may be generated from corresponding to different injector energization times in a range of 150 microseconds to an energization time of 220 microseconds, for example at 5 microsecond intervals. The fuel injection rate resulting from each test injector energization time is measured using the fuel injection rate sensor 712.

In the shown embodiment of FIG. 5, the gain curve 780 is determined in a measurement cycle operating a rail pressure of 160 MPa. Gain curves may be measured for a number of different rail pressures. For example, gain curves may be determined in a range from 25 MPa to 170 MPa. It has been found that for rail pressures beyond 170 MPa, fuel injection rate measurements can be unreliable and/or the test can be perceptibly and thus undesirably, noisy when the engine is in the idle and/or deceleration fuel cut-off state. Accordingly, in various embodiments described herein, gain curves are measured at one or more lower rail pressures and calculated using a correlation algorithm at one or more higher rail pressures. The at least one lower rail pressure may be below 170 MPa and the at least one higher rail pressure may be above 170 MPa.

The system of modules of FIG. 3 includes a correlation module 754. With additional reference to FIG. 4, the correlation module 754 is configured to use a correlation function in order to transform measured gain curve data 770 relating fuel injection rate and energization time for a particular fuel injector at a first rail pressure (e.g. 160 MPa) to correlated gain curve data 702 relating fuel injection rate and energization time at a second rail pressure (e.g. 200 MPa). The correlation function may be a function mapping each measured data point of injection rate and energization time for the first rail pressure to a corresponding data point for the second rail pressure. The correlation function may include a slope transformation term and optionally an offset transformation term (as further described below) representing different slopes and offsets of the gain curve for different rail pressures.

Referring to FIG. 5, the correlation module 754 is configured to transform the measured gain curve data 770 defining a measured gain curve 780 at one rail pressure to correlated gain curve data 702 defining a correlated gain curve 784 at another rail pressure. The correlation module 754 populates the correlation function with calibration parameters 720 (FIG. 4) obtained from a predetermined map of calibration parameters 718. The map of calibration parameters 718 may include different sets of calibration parameters 720 for different target rail pressures.

The correlation module 754 uses a correlation function in the form of a rotation matrix with offset. It has been found that a measured gain curve 780 at one rail pressure can be correlated to a gain curve 784 at another rail pressure by using such a correlation function, with suitably determined calibration parameters 720, as shown in FIG. 5. A rotation matrix is a known correlation function for performing a rotation in Euclidean space. The rotation of the measured gain curve 780 allows for the fact that gain curves have different slopes at different rail pressures. However, mere rotation is not sufficient, it has been found. Instead, a modified rotation matrix is utilized with offset terms, where the offset terms allow for different injector nozzle opening delay times and/or injector nozzle closing delay times at different rail pressures. A suitable correlation function for transforming measured gain curve data points x (energization time), y (fuel injection rate) to correlated gain curve data points x', y' has been found to have the following form:

$$x'=(x+\alpha)*\cos(\alpha)-y*\sin(\alpha)-a+b$$

$$y'=(x+\alpha)*\sin(\alpha)+y*\cos(\alpha)+c$$

where α, a, b and c are calibration parameters 720 obtained from the map of calibration parameters 718.

The calibration parameters 720 can be determined using a regression analysis on tests performed on a population of similar fuel injectors at a variety of rail pressures. Such methods of determining calibration parameters 720 for fitting correlation functions to measured data are well known in the art. For example, a least squares optimization method could be utilized. The calibration parameters 720 so obtained (usually at a manufacturing or testing plant) are stored in the map of calibration parameters 718. The calibration parameters 720 may be determined for each transformation envisaged. For example, a first set of calibration parameters 720 may be determined for transforming measured data at a first rail pressure (e.g. 160 MPa) to a second rail pressure (200 MPa) and a second set of calibration parameters 720 may be determined for transforming measured data at the first rail pressure (e.g. 160 MPa) to a third rail pressure (e.g. 220 MPa) different from the second rail pressure.

The correlation module 754 may be configured to store a map of gain curve data 706 including the measured gain curve data 770 at the test rail pressure and the correlated gain curve data 702 for at least one different rail pressure obtained using the correlation function described above.

The control signal generation module 756 is configured to utilize the stored map of gain curve data 704 in order to generate control signals to energize fuel injectors 160 during operation of the ICE 110. In particular, at least one electronic pulse defining a fuel injector energization time is generated based on a target fuel rate and rail pressure specified by the electronic control unit 450 and the associated energization time specified by the map of gain curves 704 for the target fuel rate specified rail pressure.

Figure 4:
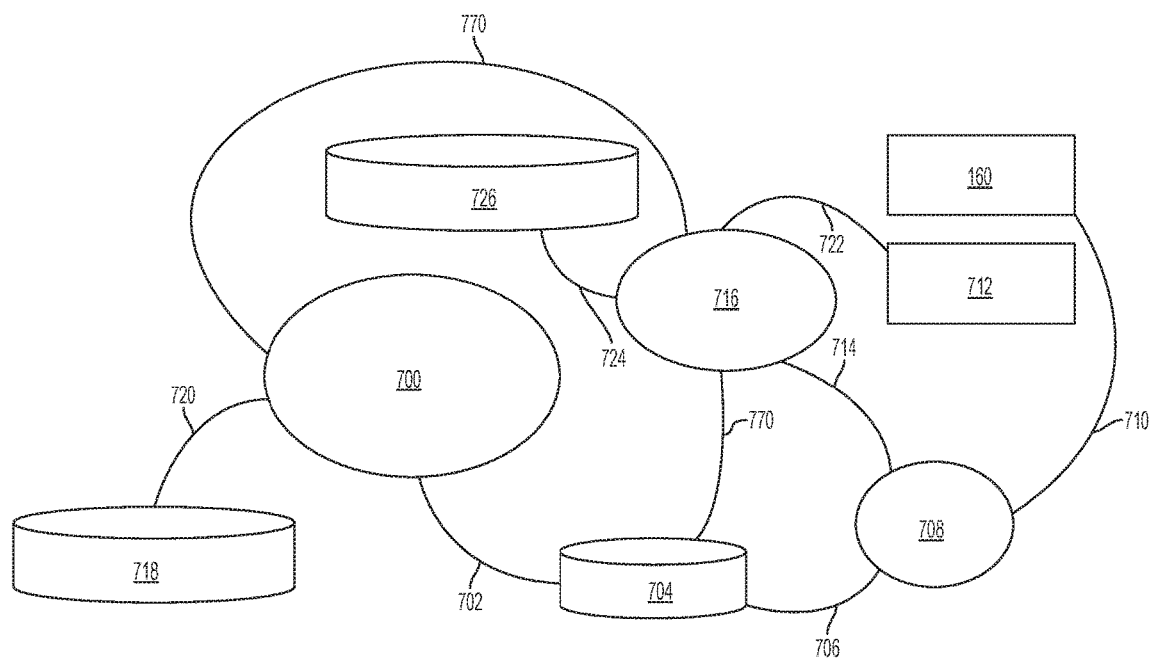
FIG. 4 is a data flow diagram for establishing gain curve data for use in generating fuel injector control signals according to various embodiments disclosed herein.
Figure 5:
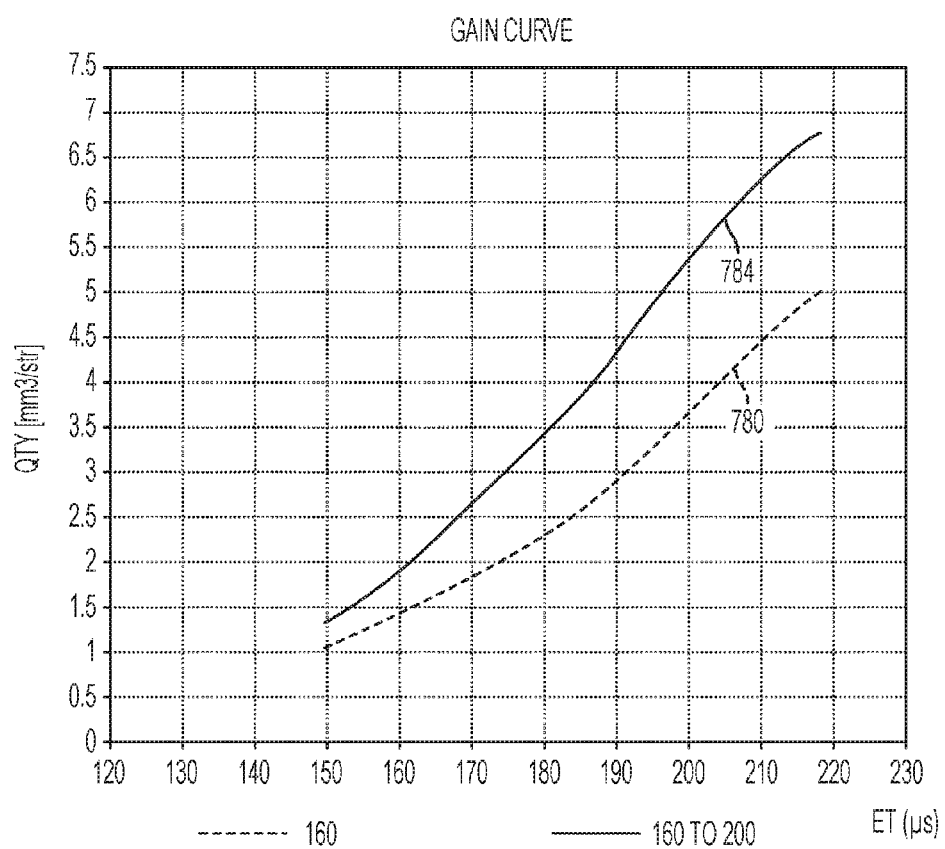
FIG. 5 shows exemplary measured and correlated gain curves at different rail pressures.

FIG. 4 shows a data flow diagram embodying methods, systems and computer programs as described herein. FIG. 4 illustrates data flows both in generating the map of gain curve data 704 for a variety of rail pressures and data flows in using the generated map of gain curve data 704 to control the fuel injectors 160. The generation of the map of gain curve data 704 may occur periodically (at regular or irregular periods) during the lifetime of a vehicle including the ICE 110 and/or to initialize the memory system 460 as a step of manufacturing. It will be understood that the injection characteristics of the fuel injector 160 may change with ageing, thereby requiring adjustments to the map of gain curve data 704 based on new measured gain curve data 770.

In FIG. 4, there is a step 716 of measuring gain curve data at a first rail pressure. This step 716 may be implemented by the gain curve measurement module 758. Test command measurement parameters 724 are obtained from a map of measurement parameters 726 during a measurement or test cycle. The measurement cycle is generally performed during engine idling conditions. A step 708 of control signal generation proceeds, via the control signal generation module 756, in which test fuel injector control signals 710 are sent to fuel injectors 160. The control signals 710 are generated as test pulses and are implemented for at least one test rail pressure. The test pulses and the at least one test rail pressure are defined according to the map of measurement parameters 726. A fuel rate sensor 712 is operative to measure fuel rate data 722 for each fuel injector 160 in response to the fuel injectors 160 being activated by the control signals 710. The measured fuel rate data 722 is associated with the fuel injector energization time that caused the corresponding fuel injector 160 to inject the measured amount of fuel in step 716. As such, the step 716 of measuring gain curve data at the first rail pressure is able to generate one or more sets of measured gain curve data 770 that defines at least one gain curve 780 as shown in FIG. 5.

The step 716 may generate a number of sets of gain curve data 770 defining a relationship between injected fuel rate and injector energization time. For example, a set of gain curve data 770 may be measured for each fuel injector 160 of the ICE 110. Further, sets of measured gain curve data 770 may be obtained for more than one rail pressure. For example, a set of measured gain curve data 770 may be obtained for each of a plurality (such as 2, 3, 4, 5 or more) of rail pressures distributed in an exemplary operating range of 25 MPa to 175 MPa.

The measurement cycle may generate control signals corresponding to a number of energization times for the at least one fuel injector 160 sufficient to generate a relationship between fuel injection rate and energization time as shown by gain curve 780. For example, at least 10 different energization times may be tested, distributed between 120 and 230 microseconds.

In step 700, measure gain curve data 770 at a first rail pressure is transformed to correlated gain curved data 702 at a second, different rail pressure using a correlation function as described above. Step 700 is performed through correlation module 754. The correlation function, described above, is populated with calibration parameters 720 that have been predetermined, where the calibration parameters 720 are specific for the transformation from the first rail pressure to the second rail pressure. The step 700 produces correlated gain curve data 702 at the second, different rail pressure for storage in the map of gain curve data 704. The step 700 may produce a plurality of sets of correlated gain curve data 702 obtained from the correlation function and different sets of calibration parameters 720.

For example, it is envisaged that measured gain curve data 770 at a first rail pressure (e.g. 160 MPa) obtained from the measurement step 716, optionally via the map of gain curves 704, can be transformed to sets of correlated gain curve data 702 for at least two further different rail pressures (e.g. 200 MPa and 220 MPa). The correlation function is loaded with different sets of calibration parameters 720, one set defining the gain curve transformation from a gain curve measured at a first rail pressure to a gain curve at a first of the two different rail pressures and another set defining the gain curve transformation from a gain curve measured at the first rail pressure to a gain curve at a second of the two different rail pressures. In an alternative embodiment, at least first and second sets of measured gain curve data 770 obtained under different rail pressures can each be transformed to one or more sets of correlated gain curve data 702 using corresponding calibration parameters 720 in the correlation function.

The correlated gain curve data 702 and the measured gain curve data 770 is stored in the map of gain curve data 704. The gain curve data 702, 770 stored in the map 704 may include respective sets of gain curve data for each fuel injector 160 of the ICE 110.

In control signal generation step 708, gain curve data 706 is retrieved from the map of gain curve data 704 during operation of the ICE 110 in order to generate control signals 710 for the fuel injectors 160 for proper operation of the ICE 110. The control signal generation step 708 is performed through the control signal generation module 756.

According to methods and systems describe herein, fuel injection rate gain curve adjustments during operation of the engine and/or memory initialization at the beginning of vehicle life can be performed efficiently and accurately. For the memory initialization, a single measurement cycle can be performed for an injector at a first rail pressure to establish a measured gain curve and the correlation function can be used to establish the gain curves at all the other rail pressures required for operation of the engine. Thus, it is possible for the correlation matrix to transform both to lower and higher rail pressure gain curves from the measured gain curve. For map adjustments, one or a plurality of maps for different rail pressures can be established using an accurate correlation law for transforming measured gain curve data at one pressure to correlated gain curve data at one or more further rail pressures. Gain curve data can be established for rail pressures greater than 170, 180, 190, 200, 210, 220 MPa, etc. by correlation without undesirable engine noise during the measurement cycle since the measured data can be established at lower rail pressures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling at least one fuel injector included in a fuel injection system of an internal combustion engine of a vehicle having a fuel rail, the method comprising:
   measuring data for the at least one fuel injector relating fuel injection flow rate and fuel injector energization time at a first rail pressure;
   transforming the measured data using a correlation function to correlated data relating fuel injection flow rate and injector energization time at a second rail pressure which is different from the first rail pressure; and
   controlling the at least one fuel injector using the correlated data relating fuel injection flow rate and injector energization time.

2. The method according to claim 1, wherein transforming the measured data using the correlation function comprises executing a rotation matrix.

3. The method according to claim 2, wherein transforming the measured data using the correlation function comprises executing a modified rotation matrix including at least one offset term.

4. The method according to 1, further comprising retrieving calibration parameters from a map of calibration parameters and using the calibration parameters in the correlation function.

5. The method according to claim 1, wherein the correlation function is of the form:

$$x'=(x+\alpha)*\cos(\alpha)-y*\sin(\alpha)-a+b$$

$$y'=(x+\alpha)*\sin(\alpha)+y*\cos(\alpha)+c$$

where:
   x and y represent the measured data including fuel injection flow rate as one of x and y and fuel injector energization time as the other of x and y;
   x' and y' represent the correlated data including fuel injection flow rate as one of x' and y' and fuel injector energization time as the other of x' and y'; and
   $\alpha$, a, b and c are calibration parameters.

6. The method according to claim 1, wherein the second rail pressure is greater than the first rail pressure.

7. The method according to claim 1, wherein the fuel injection system includes a plurality of fuel injectors and the method further comprises measuring data, transforming the measured data and controlling each of the plurality of fuel injectors.

8. The method according to claim 1, further comprising measuring at least one set of data for the at least one fuel injector relating fuel injection flow rate and fuel injector energization time under at least one test rail pressure; and transforming the measured the at least one set of measured data using the correlation function to a plurality of sets of correlated data relating fuel injection flow rate and injector energization time at respective rail pressures different from the at least one test rail pressure.

9. The method according to claim 1, further comprising operating the internal combustion engine in an idling state and measuring data during the idling state.

10. A fuel injection system, comprising:
    a fuel injector;
    a fuel rail; and
    an electronic control unit is configured to:
        measure data for the fuel injector relating fuel injection flow rate and fuel injector energization time at a first rail pressure;
        transform the measured data using a correlation function to correlated data relating fuel injection flow rate and injector energization time at a second rail pressure which is different from the first rail pressure; and
        control the fuel injector using the correlated data relating fuel injection flow rate and injector energization time.

11. The fuel injection system according to claim 9, wherein the correlation function comprises a rotation matrix.

12. The fuel injection system according to claim 10, wherein the correlation function comprises a rotation matrix with offset.

13. The fuel injection system according to claim 10, wherein the correlation function is of the form:

$$x'=(x+\alpha)*\cos(\alpha)-y*\sin(\alpha)-a+b$$

$$y'=(x+\alpha)*\sin(\alpha)+y*\cos(\alpha)+c$$

wherein:
   x and y represent the measured data including fuel injection flow rate as one of x and y and fuel injector energization time as the other of x and y;
   x' and y' represent the correlated data including fuel injection flow rate as one of x' and y' and fuel injector energization time as the other of x' and y'; and
   $\alpha$, a, b and c are calibration parameters.

14. The fuel injection system according to claim 13, wherein the electronic control unit comprises a memory having a map of the calibration parameters a, b and c stored thereon, wherein the electronic control unit is configured to retrieve the calibration parameters from the map of calibration parameters and to use the calibration parameters in the correlation function.

15. The fuel injection system according to claim 10, wherein the second rail pressure is greater than the first rail pressure.

16. The fuel injection system according to claim 10, wherein the electronic control unit is further configured to perform the measuring, using and controlling for each of a plurality of fuel injectors.

17. The fuel injection system according to claim 10, wherein the electronic control unit comprises a memory having a map of calibration parameters stored thereon, wherein the electronic control unit is configured to transform the measured data using the correlation function to a plurality of sets of correlated data relating fuel injection flow rate and injector energization time, wherein each set of correlated data corresponds to a different target rail pressure, and wherein the correlation function includes different sets of calibration parameters corresponding to the different target rail pressures for transforming the measured data to respective sets of correlated data.

18. An internal combustion engine comprising the fuel injection system of claim 10.

19. A vehicle comprising the internal combustion engine of claim 18.

20. A non-transitory computer readable medium storing a program, which when executed on an electronic control unit, is configured to:
- measure data for at least one fuel injector in a fuel injector system of an internal combustion engine relating fuel injection flow rate and fuel injector energization time at a first rail pressure;
- transform the measured data using a correlation function to correlated data relating fuel injection flow rate and injector energization time at a second rail pressure different from the first rail pressure; and
- control the at least one fuel injector using the correlated data relating fuel injection flow rate and injector energization time.

\* \* \* \* \*